United States Patent [19]

Amos

[11] 4,136,373

[45] Jan. 23, 1979

[54] BULK TAPE ERASER

[75] Inventor: Raymond E. Amos, Exeter, England

[73] Assignee: Amos of Exeter Limited, Exeter, England

[21] Appl. No.: 794,891

[22] Filed: May 9, 1977

[30] Foreign Application Priority Data

May 28, 1976 [GB] United Kingdom ............... 22374/76

[51] Int. Cl.² ............................................. H01F 13/00
[52] U.S. Cl. .................................. 361/151; 335/284; 360/66; 360/122
[58] Field of Search ............... 361/143, 146, 151, 149, 361/267; 360/118, 122, 66; 335/284, 281, 297

[56] References Cited

U.S. PATENT DOCUMENTS

| 2,702,835 | 2/1955 | Camras | 361/151 |
| 3,329,872 | 7/1967 | Amos | 361/151 |
| 3,660,727 | 5/1972 | Ohira et al. | 361/151 |

*Primary Examiner*—Gerald Goldberg
*Attorney, Agent, or Firm*—Pollock, Vande Sande and Priddy

[57] ABSTRACT

In a bulk tape eraser, the outer edge of one outer limb of an E shaped electromagnet on which the energizing coil is mounted is chamfered inwardly to form said outer limb with a narrow free end adjacent its inner edge which directs substantially the whole of the magnetic flux to the central limb of the magnet.

2 Claims, 3 Drawing Figures

BULK TAPE ERASER

INTRODUCTION

This invention is concerned with bulk tape erasers, that is devices by which the electromagnetic recordings on complete spools of tape, when wound up in a reel or on a spool or in a cassette, may be erased.

BACKGROUND OF THE INVENTION

Bulk tape erasers for erasing magnetic tape in bulk form, i.e., tape wound up in a reel or on a spool or in a cassette, include an electromagnet which is built up of laminations of silicon-iron in the shape of an "E", the energizing coil being mounted on one outer limb to concentrate the magnetic flux in a narrow but intense strip.

In recent years, various types of magnetic tapes have been developed which require a higher level of magnetic flux to bulk erase than earlier types, and an object of this invention is to provide an electromagnet system having a greater erase flux, capable of erasing such newly developed magnetic tapes without the requirement for a greater input of power to the device and consequently generation of greater heat in the device.

PRIOR ART

Assignee's U.S. Pat. No 3,329,872 issued July 4th, 1967.

SUMMARY OF THE INVENTION

The invention provides a bulk tape eraser comprising an E shaped electromagnet built up of laminations of silicon-iron and an energizing coil on one outer limb of said magnet in which the outer edge of said one outer limb at the free end of said limb is chamfered at an angle of between 55° and 65° to leave a narrow inner edge to said one outer limb whereby the magnetic flux from said limb is directed in an arc from said chamfered surface across the free end of said outer limb substantially entirely to the free end of the central limb of said magnet.

Preferably, the outer limb is chamfered at an angle of 60° and the width of the free end of said outer limb is about one-fifth the width of the main portion of the limb that is, in one embodiment about ⅛ inch.

DETAILED DESCRIPTION OF AN EMBODIMENT

Figure 1:
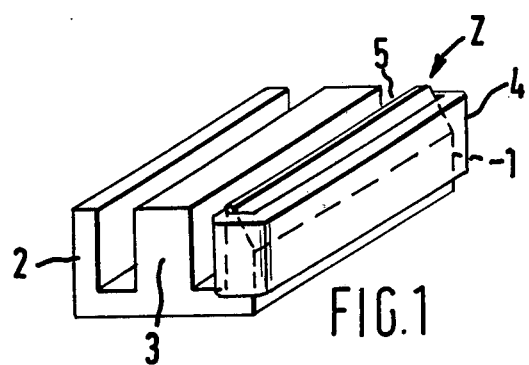
FIG. 1 is a perspective view of an electromagnet of a bulk eraser according to the invention.
Figure 2:
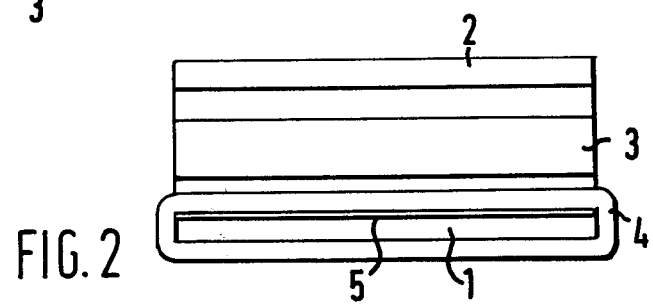
FIG. 2 is a plan view.

In the form shown, the electromagnet of a bulk eraser is built up of E shaped laminations of silicon-iron and comprises two outer limbs 1, 2 and a central limb 3 extending substantially parallel to one another. An energizing coil 4 surrounds one outer limb 1 so that this limb forms a pole piece of opposite polarity to that of the central limb 3. The free ends of limbs 1, 2 and 3 are substantially colinear with one another.

The top of the outer limb 1 is tapered from the outside surface of the limb toward the inside surface thereof at an angle of 60°, leaving the limb 1 with a relatively narrow top free edge 5 adjacent the inside surface of the limb.

Figure 3:
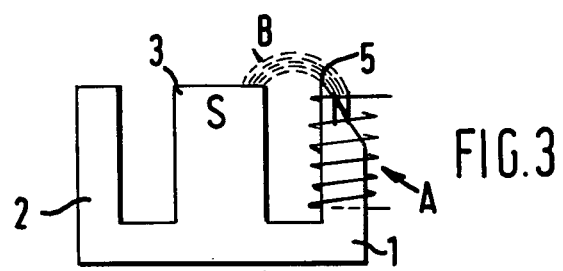
FIG. 3 is a diagrammatic section.

It has been found that with this shape of the outer limb 1, the magnetic flux B is concentrated on to the central limb 3 and there is little or no flux escaping outwardly from the limb. As shown in FIG. 3, magnetic flux B extends vertically in an arc above the free ends of limbs 1, 3. The bulk tape passes above the free ends of the limbs and through this vertically extending field for erasure.

In a particular case, a chamfer was milled from the top of pole piece 1 at an approximate angle of 60°, leaving ⅛ inch in the horizontal plane "Z". Upon energizing the device, it was of course found that the energizing current had increased due to the decrease of iron in the core and additional turns were therefore added to the energizing coil until the current reverted to the original figure and therefore, the power in the device was the same as before the chamfering of the limb 1. The magnetic flux was then measured electrically using a Siemens Gaussmeter type GMH-2 calibrated in Tesla. Readings indicated that the modified electromagnet according to the invention produced a flux 33% greater than the conventional magnet without a chamfer for the same power input. All measurements were taken 1/16 inch above the pole pieces.

To prove that this considerable increase in magnetic flux was in no way due simply to the removal of core material, further experiments were conducted on identical E cores without chamfers from which a similar cubic content of material was milled from the pole piece 1 in positions other than as a 60° chamber at the free end of the pole piece 1. The ensuing electrical tests indicated that no greater magnetic flux was produced than in the original electromagnet.

It will be understood that the invention is not restricted to the details of the preferred form described by way of example which may be modified without departure from the scope of the accompanying claims.

I claim:

1. A bulk tape eraser for erasing magnetic tape in bulk form, comprising an E-shaped magnet built up of laminations of magnetic material having a central limb and two outer limbs, said three limbs having free ends which are substantially colinear, said outer limbs extending substantially parallel to one another and to said central limb, and an energizing coil surrounding one of said two outer limbs, the outer edge of said one of said outer limbs being chamfered at the free end of said limb toward the inner edge of said limb at an angle between 55° and 65° to leave said limb with a narrow free end having a width equal to about one fifth of the width of the unchamfered portion of said limb, whereby magnetic flux from said one of said outer limbs is directed substantially entirely to said central limb and produces a magnetic field of high intensity which extends in an arc through a region between and above the free ends of said one outer limb and said central limb through which region a bulk tape may be passed for erasure.

2. A bulk tape eraser as defined in claim 1, wherein said outer limb is chamfered at an angle of 60°.

* * * * *